(No Model.)
D. WILLEY.
SAW SHARPENING MACHINE.
No. 298,928. Patented May 20, 1884.
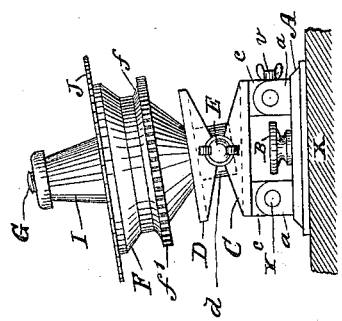
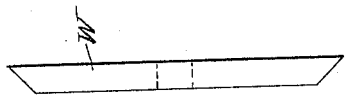
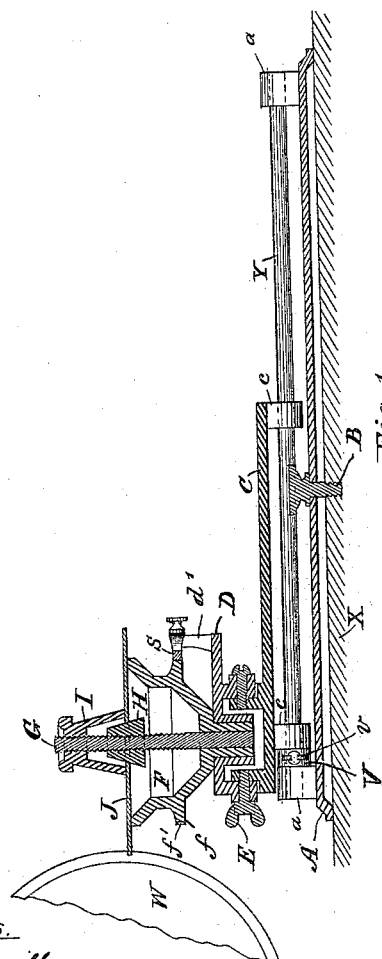
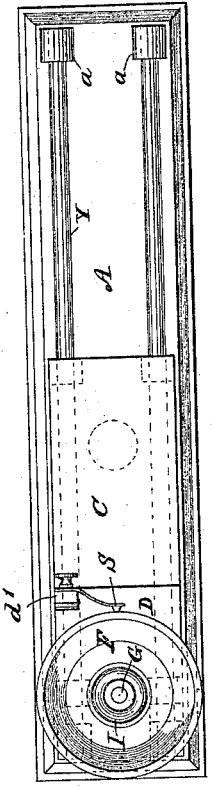
Witnesses.
Frank A. Morrill
Charles O. Foss
Inventor.
Danford Willey
per J. B. Thurston
Attorney

UNITED STATES PATENT OFFICE.

DANFORD WILLEY, OF CONCORD, NEW HAMPSHIRE.

SAW-SHARPENING MACHINE.

SPECIFICATION forming part of Letters Patent No. 298,928, dated May 20, 1884.

Application filed December 15, 1883. (No model.)

*To all whom it may concern:*

Be it known that I, DANFORD WILLEY, a citizen of the United States, residing at Concord, in the county of Merrimac and State of New Hampshire, have invented certain new and useful Improvements in Saw-Sharpening Machines, of which the following is a full, clear, and exact description.

The object of my invention is to provide a cheap but substantial machine for sharpening circular saws, in connection with an emery-wheel, without the use of a file, and at the same time to accomplish the result in a more perfect, rapid, and consequently more economical manner than by recourse to any of the ordinary methods.

In order to clearly show of what my invention consists, I will here refer to the accompanying drawings, forming part of this specification, in which similar letters of reference indicate corresponding parts in all the figures, of which—

Figure 1 is a central longitudinal section showing a saw and portion of an emery-wheel in position. Fig. 2 is an end view of the machine with saw in position and table slightly tilted. Fig. 3 represents a general plan of the machine with saw removed. Fig. 4 shows an edge view of an emery-wheel as prepared for use.

The base A is provided with ears $a$, located at or near each corner thereof, and by means of a cap or thumb-screw, B, passed through the same and into the table X, upon which it rests, said base is secured firmly therein.

C is a sliding carriage having ears $c$ projecting downward, through which the rods Y are passed, the ends of said rods being secured within the ears $a$, which are cast upon the top side of the base. Thus the carriage C may be moved upon and lengthwise of said base when it is desirable so to do, for a purpose to be hereinafter fully explained. A table, D, is hinged in some suitable manner to the top of the carriage C, and may be tilted toward either side of said carriage, and so held, when desired, by means of the thumb-screw E.

Projecting from the bottom side and about in the center of the table D is a boss, $d$, of suitable length, perforated with a hole, into which the small end of the saw-rest F is fitted. This saw-rest is formed of cast-iron, and is flaring from the bottom upward, the sides of which are preferably made circular, and an annular flange, $f$, projecting half an inch (more or less) at any suitable point between the bottom and top thereof, is provided with fine teeth $f'$, for a purpose hereinafter mentioned. A spindle, G, is rigidly fastened in the center of the saw-rest F by being driven into a hole in the small end or bottom thereof, and extends upward about four inches. A cone-shaped nut, H, is threaded to the spindle G, and an outer nut, I, which is hollowed out and made sufficiently large to cover said nut H, is also threaded to the spindle G, and is preferably formed as is shown in Fig. 1.

Having described the different parts of which my device consists, I will now proceed to explain their operation. The saw J is placed upon the cone-nut H, which is thus formed with tapering sides, in order that it may readily adapt itself to various saws which fit arbors of different diameters—i. e., a saw which fits an arbor of three-fourths of an inch diameter will set pretty near the top of the cone-nut, while a saw having a hole to fit an arbor of one inch or one and one-quarter inch diameter will rest pretty near the bottom of said cone-nut. By screwing the cone-nut H either up or down, as may be required, the saw can be made to bear both upon the cone-nut and the circular rest F, and by screwing the outer nut, I, down over the said cone-nut until it bears upon the saw J said saw will be clamped firmly to the rest F, after which the saw is then ready to be operated upon. The sliding carriage C should be moved away from the emery-wheel W while the saw is being secured in position. When all is ready, the carriage C should be moved forward until close to the wheel. Then the stop V may be moved back and secured by the set-screw $v$ at such a point on the rods Y as will allow the carriage the necessary movement farther forward which is required to sharpen the teeth of the saw.

In sharpening ordinary saws upon which the teeth are comparatively regular no gage is required; but the carriage may be moved forward, and when one tooth is sharpened drawn away and rotated sufficiently to bring the next tooth in line with the wheel, (by means of the saw-rest F and table D,) and so on until all have been sharpened, using the teeth themselves as a guide; but when, from frequent filing, a saw is found to have teeth of very irregular length both circumferentially and radially, or when entire new teeth are required, it becomes necessary to provide a gage or calendar, by aid of which any given number of teeth may be cut. For this purpose the teeth $f'$ are cut in the edge of the annular flange $f$, and a spring-catch, S, is so fastened to the lug $d'$, cast upon the table D, by means of a thumb-screw, as that it will engage in the said teeth $f'$, if desired, and thus enable the operator to cut teeth of equal length circumferentially, and by means of the stop V the teeth are also cut of equal length radially, and at the same time the hole in the saw will necessarily be left perfectly concentric with the points of the teeth.

By loosening the thumb-screw which holds the spring-catch S in position, and turning said catch out of line with the teeth $f'$, and setting the stop V in the proper position, a saw may be rotated while bearing against the emery-wheel W, and thus all the saw-teeth may be ground off, leaving a perfect circular edge, into which new teeth may be cut, as previously described. In order to use an emery-wheel for this purpose, it must first be turned to a beveled edge, as is shown in Fig. 4. The stop V may be simply a loose collar, and placed upon one of the rods Y, having a set-screw to hold it wherever desired.

In the drawings a saw of very small diameter is shown—in fact, as small a one as could be cut upon the machine as constructed—and in order to bring it in contact with the emery-wheel W the carriage C and stop V have been placed as far forward as their limit of movement will admit.

In place of the rods Y, the carriage C may be fitted to the base A by an ordinary tongue and groove; but for purposes of economy in manufacture I prefer the construction shown.

I am aware of Patent No. 112,838, dated November 1, 1871, which covers a device for sharpening circular saws by means of an emery-wheel, in combination with a stand carrying said wheel or wheels. I therefore am content to confine myself to the device for holding circular saws for the purpose of sharpening the same upon an emery-wheel constructed as herein shown, independent of the stand carrying said wheel.

Having thus fully described my invention, I claim—

1. In a machine for sharpening circular saws, the combination of the saw-rest F, having flange $f$ and teeth $f'$, and provided with the spindle G, to which are threaded the nuts H I, with the tilting table D having spring-catch S, said parts F and D being connected and rendered capable of rotary motion, substantially in the manner described.

2. In a machine for sharpening circular saws by means of an emery-wheel having an iron base, to which may be attached a sliding carriage, the tilting table D, hinged to said carriage, and provided with a spring-catch, S, in combination with the revolving saw-rest F, having flange $f$ and teeth $f'$, and the spindle G, to which are threaded the nuts H I, operating substantially as and for the purposes specified.

DANFORD WILLEY.

Witnesses:
J. B. THURSTON,
NATHANIEL E. MARTIN.